US012700214B2

(12) United States Patent
Li et al.

(10) Patent No.: US 12,700,214 B2
(45) Date of Patent: Aug. 4, 2026

(54) METHOD AND APPARATUS FOR OBJECT LOCALIZATION IN DISCONTINUOUS OBSERVATION SCENE, AND STORAGE MEDIUM

(71) Applicant: BEIJING YOUZHUJU NETWORK TECHNOLOGY CO., LTD., Beijing (CN)

(72) Inventors: Yifeng Li, Beijing (CN); Guanglin Li, Beijing (CN); Tao Kong, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 299 days.

(21) Appl. No.: 18/569,508

(22) PCT Filed: Oct. 12, 2022

(86) PCT No.: PCT/CN2022/124913
§ 371 (c)(1),
(2) Date: Dec. 12, 2023

(87) PCT Pub. No.: WO2023/082922
PCT Pub. Date: May 19, 2023

(65) Prior Publication Data
US 2024/0221353 A1　Jul. 4, 2024

(30) Foreign Application Priority Data

Nov. 15, 2021　(CN) .......................... 202111349093.5

(51) Int. Cl.
*G06V 10/74* (2022.01)
*G06N 3/045* (2023.01)
(Continued)

(52) U.S. Cl.
CPC ........... *G06V 10/761* (2022.01); *G06N 3/045* (2023.01); *G06N 3/08* (2013.01); *G06T 3/14* (2024.01);
(Continued)

(58) Field of Classification Search
CPC .................... G06V 10/761; G06T 7/38; G06T 2207/10024; G06T 2207/10028;
(Continued)

(56) References Cited

U.S. PATENT DOCUMENTS

2019/0028637 A1　1/2019　Kolesov et al.
2019/0147589 A1　5/2019　Zhou et al.
(Continued)

FOREIGN PATENT DOCUMENTS

CN　　105469103 A　*　4/2016
CN　　108038906 A　　5/2018
(Continued)

OTHER PUBLICATIONS

Xu et al., "MID-Fusion: Octree-based Object-Level Multi-Instance Dynamic SLAM," arXiv, Mar. 21, 2019, pp. 1-7. (Year: 2019).*
(Continued)

*Primary Examiner* — Emily C Terrell
*Assistant Examiner* — Daniella M. DiGuglielmo

(57) ABSTRACT

The present disclosure relates to a method and apparatus of object localization in a discontinuous observation scene, and a storage medium. Provided is a method of object localization in a discontinuous observation scene, comprising: acquiring an object model based on a benchmark image that is obtained when an observation is resumed from interruption, and based on the acquired object model and an object reconstruction model, achieving association between objects before and after the observation interruption.

16 Claims, 4 Drawing Sheets

(51) Int. Cl.

| | |
|---|---|
| *G06N 3/08* | (2023.01) |
| *G06T 3/14* | (2024.01) |
| *G06T 7/246* | (2017.01) |
| *G06T 7/30* | (2017.01) |
| *G06T 7/38* | (2017.01) |
| *G06T 7/73* | (2017.01) |

(52) U.S. Cl.
CPC ............... *G06T 7/251* (2017.01); *G06T 7/30* (2017.01); *G06T 7/38* (2017.01); *G06T 7/75* (2017.01); *G06T 2207/10024* (2013.01); *G06T 2207/10028* (2013.01)

(58) Field of Classification Search
CPC .. G06T 7/251; G06T 7/30; G06T 7/75; G06T 3/14; G06N 3/045; G06N 3/08
See application file for complete search history.

(56) References Cited

U.S. PATENT DOCUMENTS

| | | | |
|---|---|---|---|
| 2021/0065398 A1* | 3/2021 | Cui | G06T 7/292 |
| 2022/0351466 A1 | 11/2022 | Huang et al. | |

FOREIGN PATENT DOCUMENTS

| | | | | |
|---|---|---|---|---|
| CN | 109410316 A | | 3/2019 | |
| CN | 109686093 A | | 10/2019 | |
| CN | 110942511 A | | 3/2020 | |
| CN | 111462179 A | | 7/2020 | |
| CN | 111951158 A | * | 11/2020 | G06T 7/70 |
| CN | 112782696 A | * | 5/2021 | G01S 13/9019 |
| CN | 112884894 A | | 6/2021 | |
| CN | 113160391 A | | 7/2021 | |
| CN | 113436318 A | * | 9/2021 | G06T 17/00 |
| CN | 113989374 A | | 1/2022 | |

OTHER PUBLICATIONS

Runz et al., "Co-Fusion: Real-time Segmentation, Tracking and Fusion of Multiple Objects," IEEE International Conference on Robotics and Automation (ICRA), Jun. 3, 2017, pp. 4471-4478. (Year: 2017).*

Runz et al., "MaskFusion: Real-Time Recognition, Tracking and Reconstruction of Multiple Moving Objects," IEEE International Symposium on Mixed and Augmented Reality (ISMAR), Oct. 20, 2018, pp. 10-20. (Year: 2018).*

Fang et al., "GraspNet-1Billion: A Large-Scale Benchmark for General Object Grasping," Proceedings of the IEEE/CVF Conference on Computer Vision and Pattern Recognition (CVPR), 2020, pp. 11444-11453. (Year: 2020).*

Okorn et al., "ZePHyR: Zero-shot Pose Hypothesis Rating," arXiv, Apr. 30, 2021, pp. 1-14. (Year: 2021).*

Notice of Registration Procedure received from Chinese patent application No. 202111349093.5 mailed on Aug. 18, 2025, 8 pages (4 pages English Translation and 4 pages Original Copy).

Coumans et al., "Pybullet, a python module for physics simulation for games, robotics and machine learning", https://docs.google.com/document/d/10sXEhzFRSnvFcl3XxNGhnD4N2SedqwdAvK3dsihxVUA/edit#heading=h.2ye70wns7io3, vol. 2019, 2016, pp. 1-6.

Cuturi M., "Sinkhorn Distances: Lightspeed Computation of Optimal Transport", arXiv:1306.0895, vol. 1, 2013, pp. 1-13.

Deng et al., "PoseRBPF: A Rao-Blackwellized Particle Filter for 6-D Object Pose Tracking", arXiv:1905.09304, vol. 1, May 22, 2019, pp. 1-10.

Fang et al., "GraspNet-1Billion: A Large-Scale Benchmark for General Object Grasping", Proceedings of the IEEE/CVF Conference on Computer Vision and Pattern Recognition (CVPR), 2020, pp. 11444-11453.

Flamary et al., "Python Optimal Transport", Journal of Machine Learning Research, vol. 22, No. 78, 2021, pp. 1-8.

He et al., "Mask R-CNN", Proceedings of the IEEE International Conference on Computer Vision (ICCV), 2017, pp. 2961-2969.

Hodan et al., "BOP Challenge 2020 on 6D Object Localization", Computer Vision—ECCV 2020 Workshops, vol. 12536, No. 01, Jan. 03, 2021, pp. 577-594.

Hodan et al., "EPOS: Estimating 6D Pose of Objects With Symmetries", Proceedings of the IEEE/CVF Conference on Computer Vision and Pattern Recognition (CVPR), 2020, pp. 11703-11712.

International Search Report received for PCT Patent Application No. PCT/CN2022/124913, mailed on Dec. 23, 2022, 02 pages.

Labbe et al., "CosyPose: Consistent Multi-view Multi-object 6D Pose Estimation", Computer Vision—ECCV 2020, vol. 12362, No. 1, Nov. 19, 2020, pp. 574-591.

Li et al., "DeepIM: Deep Iterative Matching for 6D Pose Estimation", Proceedings of the European Conference on Computer Vision (ECCV), 2018, pp. 683-698.

Li et al., "MOLTR: Multiple Object Localization, Tracking and Reconstruction From Monocular RGB Videos", IEEE Robotics and Automation Letters, vol. 06, No. 2, Feb. 22, 2021, pp. 3341-3348.

Li et al., "Simultaneous Semantic and Collision Learning for 6-DoF Grasp Pose Estimation", IEEE/RSJ International Conference on Intelligent Robots and Systems (IROS), vol. 01, Oct. 1, 2021, pp. 1-8.

Manuelli et al., "KPAM: KeyPoint Affordances for Category-Level Robotic Manipulation", arXiv:1903.06684, vol. 2, Oct. 29, 2019, pp. 1-26.

Mccormac et al., "Fusion++: Volumetric Object-Level SLAM", 2018 International Conference on 3D Vision (3DV), Sep. 8, 2018, pp. 1-10.

Okorn et al., "ZePHyR: Zero-shot Pose Hypothesis Rating", 2021 IEEE International Conference on Robotics and Automation (ICRA), Jun. 5, 2021, pp. 1-14.

Park et al., "LatentFusion: End-to-End Differentiable Reconstruction and Rendering for Unseen Object Pose Estimation", Proceedings of the IEEE/CVF Conference on Computer Vision and Pattern Recognition (CVPR), 2020, pp. 10710-10719.

Park et al., "Pix2Pose: Pixel-Wise Coordinate Regression of Objects for 6D Pose Estimation", Proceedings of the IEEE/CVF International Conference on Computer Vision (ICCV), 2019, pp. 7668-7677.

Qi et al., "PointNet++: Deep Hierarchical Feature Learning on Point Sets in a Metric Space", 31st Neural Information Processing Systems, 2017, pp. 1-10.

Rezatofighi et al., "Generalized Intersection Over Union: A Metric and a Loss for Bounding Box Regression", Proceedings of the IEEE/CVF Conference on Computer Vision and Pattern Recognition (CVPR), 2019, pp. 658-666.

Rünz et al., "Co-fusion: Real-time segmentation, tracking and fusion of multiple objects", IEEE International Conference on Robotics and Automation (ICRA), Jun. 3, 2017, pp. 4471-4478.

Runz et al., "MaskFusion: Real-Time Recognition, Tracking and Reconstruction of Multiple Moving Objects", IEEE International Symposium on Mixed and Augmented Reality (ISMAR), Oct. 20, 2018, pp. 10-20.

Salas-Moreno et al., "SLAM++: Simultaneous Localisation and Mapping at the Level of Objects", Proceedings of the IEEE Conference on Computer Vision and Pattern Recognition, Jun. 2013, pp. 1-8.

Sucar et al., "NodeSLAM: Neural Object Descriptors for Multi-View Shape Reconstruction", arXiv:2004.04485, Oct. 10, 2020, pp. 949-958.

Sundermeyer et al., "Implicit 3D Orientation Learning for 6D Object Detection from RGB Images", Proceedings of the European Conference on Computer Vision (ECCV), 2018, pp. 699-715.

Wang et al., "DenseFusion: 6D Object Pose Estimation by Iterative Dense Fusion", Proceedings of the IEEE/CVF Conference on Computer Vision and Pattern Recognition (CVPR), 2019, pp. 3343-3352.

Wang et al., "Normalized Object Coordinate Space for Category-Level 6D Object Pose and Size Estimation", Proceedings of the

(56) References Cited

OTHER PUBLICATIONS

IEEE/CVF Conference on Computer Vision and Pattern Recognition (CVPR), 2019, pp. 2642-2651.

Wang et al., "SOLOv2: Dynamic and Fast Instance Segmentation", arXiv:2003.10152, Oct. 23, 2020, pp. 1-12.

Weng et al., "GNN3DMOT: Graph Neural Network for 3D Multi-Object Tracking with Multi-Feature Learning", arXiv:2006.07327, Jun. 12, 2020, pp. 1-10.

Wu et al., "3D ShapeNets: A Deep Representation for Volumetric Shapes", Proceedings of the IEEE Conference on Computer Vision and Pattern Recognition (CVPR), 2015, pp. 1912-1920.

Xiang et al., "PoseCNN: A Convolutional Neural Network for 6D Object Pose Estimation in Cluttered Scenes", arXiv:1711.00199, May 26, 2018, pp. 1-10.

Xu et al., "MID-Fusion: Octree-based Object-Level Multi-Instance Dynamic SLAM", International Conference on Robotics and Automation (ICRA), May 24, 2019, pp. 5231-5237.

Yew et al., "RPM-Net: Robust Point Matching Using Learned Features", Proceedings of the IEEE/CVF Conference on Computer Vision and Pattern Recognition (CVPR), 2020, pp. 11824-11833.

Zhou et al., "Open3D: A Modern Library for 3D Data Processing", arXiv:1801.09847, Jan. 30, 2018, pp. 1-6.

Zhu et al., "Target-driven visual navigation in indoor scenes using deep reinforcement learning", arXiv:1609.05143, Jun. 3, 2017, pp. 3357-3364.

Office action received from Chinese patent application No. 202111349093.5 mailed on Feb. 14, 2025, 16 pages (8 pages English Translation and 8 pages Original Copy).

\* cited by examiner (a)          (b)

METHOD AND APPARATUS FOR OBJECT LOCALIZATION IN DISCONTINUOUS OBSERVATION SCENE, AND STORAGE MEDIUM

CROSS-REFERENCE OF RELATED APPLICATION

This application is a national stage of International Application No. PCT/CN2022/124913, filed on Oct. 12, 2022, which claims the priority of China Patent Application 202111349093.5 filed on Nov. 15, 2021 with the application name, both of the aforementioned applications are hereby incorporated by reference in their entireties.

FIELD OF THE INVENTION

This disclosure relates to computer vision, including object localization in computer vision.

BACKGROUND

Dynamic object reconstruction and localization belong to key tasks in the fields of computer vision and robotics, and their applications may include a variety of application scenarios from autonomous navigation, augmented reality to robotic grasping and manipulation. In related technologies, it may either rely on computer-aided design (CAD) models for objects, or it may require continuous observations to handle the reconstruction and localization of dynamic objects. However, conventional methods often ignore that commodities have different shapes and sizes, and computer-aided design models may not be known or readily available. In practice, the obtained object model may be segmented due to limited viewing angles or inter-object occlusions, and the sensor may not be able to continuously observe multiple objects. During interruption/loss of observation, the layout of objects may have changed dramatically, which will adversely affect object observation, reconstruction and localization.

DISCLOSURE OF THE INVENTION

This Summary is provided to introduce the invention concepts in a simplified form, such concepts will be further described in the DETAILED DESCRIPTION OF PREFERRED EMBODIMENTS. This Summary is not intended to identify key features or essential features of the claimed technical solution, nor is intended to be used to limit the scope of the claimed technical solution.

According to some embodiments of the present disclosure, there is provided a method of object localization in a discontinuous observation scene, including the following steps: acquiring an object model based on a benchmark image that is obtained when observation is resumed from interruption: and based on the acquired object model and an object reconstruction model, achieving association between objects before and after the observation interruption.

According to other embodiments of the present disclosure, there is provided an apparatus for object localization in a discontinuous observation scene, including a module acquisition unit configured to acquire an object model based on a benchmark image that is obtained when observation is resumed from interruption: and a association unit configured to, based on the acquired object model and an object reconstruction model, achieve association between objects before and after the observation interruption.

According to some embodiments of the present disclosure, there is provided an electronic device including: a memory: and a processor coupled to the memory, the processor configured to, based on instructions stored in the memory, execute the method according to any embodiment of the present disclosure as described.

According to some embodiments of the present disclosure, there is provided a computer-readable storage medium having stored thereon a computer program that, when executed by a processor, causes implementation of the method according to any embodiment of the present disclosure as described.

According to some embodiments of the present disclosure, there is provided a computer program product comprising instructions that, when executed by a processor, causes implementation of the method according to any embodiment of the present disclosure as described.

According to some embodiments of the present disclosure, there is provided a computer program comprising program codes that, when executed by a computer, cause implementation of the method according to any embodiment of the present disclosure as described.

Other features, aspects, and advantages of the present disclosure will become apparent from the following detailed description of exemplary embodiments of the present disclosure with reference to the accompanying drawings.

DESCRIPTION OF THE DRAWINGS

Preferred embodiments of the present disclosure will be described below with reference to the accompanying drawings. The accompanying drawings, illustrated here, are included to provide a further understanding of the disclosure, and each drawing, together with the following detailed description, are incorporated in and form a part of this specification for explaining the disclosure. It should be understood that the drawings in the following description only relate to some embodiments of the present disclosure, instead of limiting the present disclosure. In the drawings.

Figure 1:
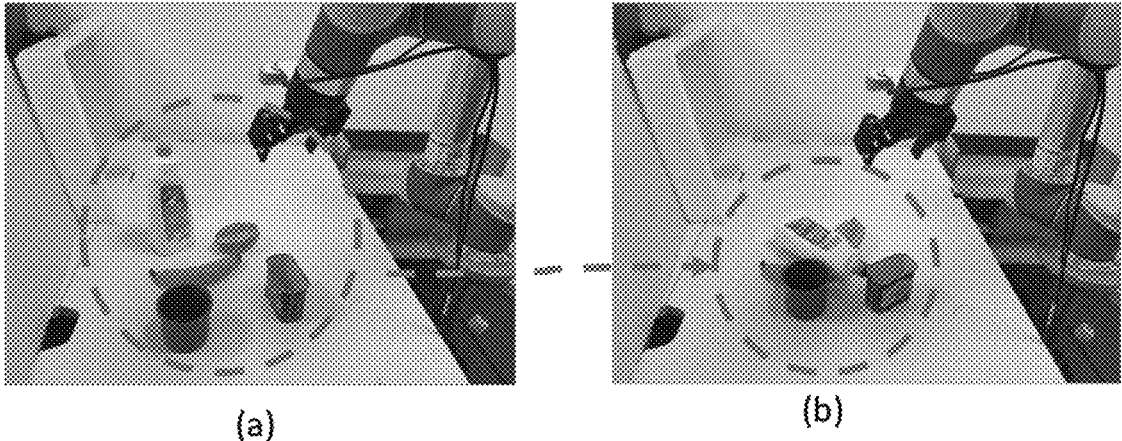
FIG. 1 schematically shows a discontinuous observation scene.

It should be understood that, for convenience of description, dimensions of various parts shown in the drawings are not necessarily drawn in actual scale. The same or similar reference symbols are used in the various drawings to identify the same or similar parts. Therefor, once an item is defined in one figure, it may not be further discussed in subsequent figures.

DETAILED DESCRIPTION OF PREFERRED EMBODIMENTS

The technical solutions in the embodiments of the present disclosure will be clearly and completely described below with reference to the accompanying drawings in the embodiments of the present disclosure. However, it is obvious that the described embodiments are only some of the embodiments of the present disclosure, rather than all of the embodiments. The following description of the embodiments is merely illustrative and is in no way intended to limit the present disclosure, its application or usage. It should be understood that the present disclosure may be embodied in various forms and should not be construed as limited to the embodiments set forth herein.

It should be understood that various steps described in the method embodiments of the present disclosure may be executed in different orders and/or in parallel. Furthermore, method embodiments may include additional steps and/or omit performance of illustrated steps. The scope of the present disclosure is not limited in this regard. Unless specifically stated otherwise, the relative arrangements of components and steps, numerical expressions, and numerical values set forth in these embodiments are to be construed as illustrative only and do not limit the scope of the present disclosure.

The term "comprise" and its variations used in this disclosure means an open term that includes at least the following elements/features but does not exclude other elements/features, that is, "comprise but not limited to". In addition, the term "include" and its variations used in this disclosure means an open term that includes at least the following elements/features but does not exclude other elements/features, that is, "include but not limited to". Therefore, "comprise" and "include" are synonymous. The term "based on" means "based at least in part on."

Reference to "one embodiment," "some embodiments," or "an embodiment" throughout this specification means that particular features, structures, or characteristics described in combination with the embodiment is included in at least one embodiment of the present disclosure. For example, the term "one embodiment" means "at least one embodiment": the term "another embodiment" means "at least one additional embodiment": and the term "some embodiments" means "at least some embodiments." Furthermore, appearances of the phrases "in one embodiment," "in some embodiments," or "in an embodiment" in various places throughout this specification do not necessarily all refer to the same embodiment, alternatively, may also refer to the same embodiment.

It should be noted that concepts such as "first", "second", etc. mentioned in this disclosure are only used to distinguish different apparatuses, modules or units, and are not used to limit the order or interdependence of functions performed by these apparatuses, modules or units. Unless otherwise specified, concepts such as "first", "second", etc. are not intended to imply that the objects so described must be in a given order temporally, spatially, ranked, or in any other order.

It should be noted that the modifications of "one" and "multiple" mentioned in this disclosure are illustrative and not restrictive. Those skilled in the art will understand that unless specifically stated in the context, it should be understood as "one or multiple".

The names of data, messages or information interacted in the embodiments of the present disclosure are for illustrative purposes only and are not used to limit the scope of these data, messages or information.

Dynamic object reconstruction and localization are crucial for robots to understand the surrounding environment and manipulate objects in the environment during robotic operations. On one hand, reconstruction can help to model an object which is partially observed or occluded. On the other hand, accurate pose estimation can improve the completeness and accuracy of object reconstruction.

Some current works achieve dynamic object reconstruction by introducing an additional segmentation network module in a synchronous localization and mapping (SLAM) system to distinguish objects of interest. In these works, either the object category is assumed to be known, or continuous observations are required. However, during real robot operation, these assumptions may not be guaranteed. Current object pose estimation methods mainly rely on known computer-aided design (CAD) models or need to scan objects to obtain high-quality models at a great cost. Furthermore, these methods may need to train a new weight for each object or category, which limits generalizability and is obviously not suitable for realistic scenarios.

Moreover, in practice, there may be a case that observation interruption/loss may occur, resulting in discontinuous observation, including but not limited to scene change, object occlusion, object entry and exit, etc. that may cause changes in the observation scene. During the observation interruption/loss, the layouts of objects may have changed dramatically. FIG. 1 shows a scene where discontinuous observations occur over time, wherein the layouts of objects may have changed dramatically during the observation interruption/loss. (a) and (b) in FIG. 1 show the object layout before and after observation interruption/loss respectively. Compared with (a), the object shown in (b) that is observed after recovery from the interruption is completely disrupted. This will adversely affect object observation, reconstruction and localization. In this case, how to associate objects in discontinuous observations and accurately localize objects in new scenes is a quite challenging problem.

In view of this, there is proposed an improved scheme capable of implementing dynamic object localization without continuous observations and known computer-aided design models.

In practical application scenes, such as robot operation and grasping tasks, continuous observation of objects in the scene cannot be guaranteed due to limited viewing angles or mutual occlusion between objects. In discontinuous observations, the spatial and motion continuities of objects cannot be guaranteed, but most rigid object models will not change in texture and structure. Therefore, a rigid object model is essential for many applications and has become an essential association between different observations. Therefore, the solution of the present disclosure performs localization of an object in discontinuous observation scenes by acquiring models of the object before and after the observation interruption. In particular, in a scene that a discontinuous observations occur, the solution of the present disclosure can acquire an object model after resuming the observation, and based on the acquired object model and an object reconstruction model that is obtained based on information before the observation interruption, achieve association between objects before and after the observation interruption, thereby the accuracy of object localization can be further improved.

In addition, in the solution of the present disclosure, after the object association has been performed, an object pose can be further estimated to perform object alignment in order to facilitate subsequent processing for the object. For example, dynamic object reconstruction and pose estimation tasks can be handled robustly without the need of CAD models and continuous observations, and explicit point cloud models suitable for robot object grasping can be generated.

Embodiments according to the present disclosure, especially that related to object association and localization of aligned objects in discontinuous observation scenes, will be described in detail below with reference to the accompanying drawings.

Figure 2A:
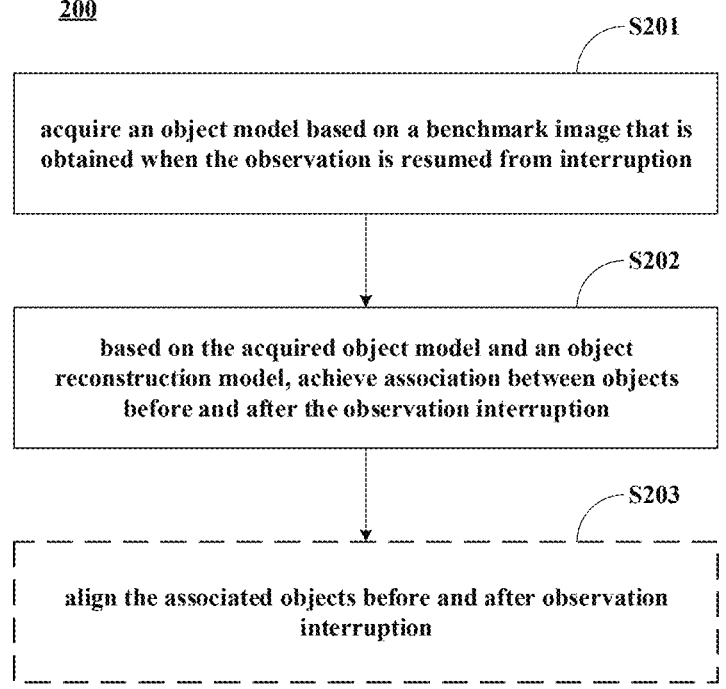
FIGS. 2A and 2B show a method of object localization in a discontinuous observation scene according to an embodiment of the present disclosure.

FIG. 2A shows a method of object localization in a discontinuous observation scene according to an embodiment of the present disclosure. In the method 200, in step S201, acquire an object model based on a benchmark image that is obtained when observation is resumed from interruption: and in step S202, based on the acquired object model and an object reconstruction model, achieve association between objects before and after the observation interruption.

According to some embodiments of the present disclosure, the object model obtained based on the benchmark image is a model of the object in an observation scene after the observation is resumed/the scene changes. In some embodiments, the object model acquired based on the benchmark image can be a model of various appropriate forms, which can contain/indicate/describe various attribute information of the object in the observation scene, including texture, structure, pose, color, etc. In some embodiments, the object model is an object point cloud model, which may be in any suitable form.

In some embodiments, the benchmark image used to generate the object model may be a predetermined number of images observed after the observation is resumed. Preferably, in order to realize the object localization after the observation is resumed as soon as possible and realize association between objects before and after the observation interruption as soon as possible, the first predetermined number of consecutive images after the observation is resumed can be used to generate the object model. The predetermined number should be as small as possible to implement object association quickly and efficiently. In particular, the benchmark image is an image obtained from a single perspective when the observation is resumed, such as the starting image that is obtained when the observation is resumed, for example, the first frame image. In some instances, the benchmark image may be referred to as a query image.

In some embodiments, a 2.5D instance point cloud may be acquired from the benchmark image as an object point cloud model, in particular, a 2.5D instance point cloud may be acquired from a starting image. As an example, a 2.5D instance point cloud can be obtained from a depth image by back-projection under the guidance of an instance segmentation network. In particular, in an embodiment of the present disclosure, due to possible object arrangement, occlusion, etc., the observed benchmark image after the observation is resumed, such as a single-view image, may not fully reflect all objects in the scene, or even can reflect only part of the object, so the acquired object point cloud model is essentially a point cloud model of incomplete objects or partial objects, for example, it can belong to a partial point cloud observed at a single perspective, which is an incomplete point cloud model. Therefore, throughout the specification, the object point cloud model acquired from the benchmark image is also referred to as a "partial object point cloud model" or an "incomplete object point cloud model", and these expressions are synonymous in the context of this disclosure.

According to some embodiments of the present disclosure, the reconstruction model of an object may refer to a model of the object in the scene before the observation interruption/scene change, which can be used for processing in combination with the object model obtained after the observation interruption/scene change, to realize the association between objects before and after the observation interruption/scene change. In some embodiments, the object reconstruction model is obtained by performing model reconstruction for the object based on consecutive images of the object. In some embodiments, the consecutive images of the object are a predetermined number of consecutive observation images before the observation is interrupted.

In some embodiments, the object reconstruction model may be predetermined and stored in an appropriate storage device. In particular, model reconstruction can be performed as the object is continuously observed, and be stored in an appropriate storage device. For example, model reconstruction may be performed periodically, such as during continuous observations of the object. In addition, model reconstruction can be performed continuously, for example, model reconstruction can be performed every time a predetermined number of images are continuously observed. In this way, the pre-stored object reconstruction model can be directly called at the beginning of object localization/association operation in a discontinuous observation scene. In other embodiments, at the beginning of the object localization/association operation starts in the discontinuous observation scene, object reconstruction may be performed first, for example, an object reconstruction model can be acquired based on a predetermined number of continuous observed images before the observation is interrupted, therefore, the object localization can be performed based on the reconstructed model.

In some embodiments, the object reconstruction model is any suitable type of object model, in particular, it may be a surfel-based model, a point cloud model, or any other suitable object model. Similarly, it can also contain/indicate/describe various attribute information of the object in the observation scene, including texture, structure, pose, color, etc. In some embodiments, consecutive images may include consecutive RGB images and depth images of the object, also known as RGB-D images, and preferably the model reconstructed based on consecutive images is a surfel-based model. Compared with a single-view point cloud-based model, the surfel-based model can acquire more comprehensive object attribute information for creating a more complete model, thereby reducing or even eliminating geometric and density errors of objects.

In the solution of the present disclosure, model reconstruction for the object can be performed using various methods. As an example, given an RGB-D image as input, object-level model construction can be achieved by introducing a learning-based instance segmentation method in SLAM to acquire an object reconstruction model, such as SLAM++, Fusion++, Co-Fusion, MaskFusion, MID-Fusion, etc. in related technologies. In some embodiments, preferably, based on MaskFusion, surface elements (surfels) can be used to represent the object model during construction, so that the obtained surfel object model can more accurately and comprehensively reflect the characteristics of the object than the point cloud model, so that in operation, the solution of the present disclosure is more efficient than when the point cloud model is applied.

According to some embodiments of the present disclosure, the association between objects before and after the observation interruption may refer to matching between objects before and after the observation interruption, that is, finding the correspondence between objects before and after the observation interruption, especially the one-to-one correspondence, so that objects before the observation interruption can be associated with objects re-observed after the interruption is resumed in order to facilitate subsequent operations. In various tasks, usually in multiple object tracking (MOT), the object association across different frames has been studied. MOT focuses on tracking dynamic objects across consecutive frames. Most MOT methods rely on continuity assumptions (such as GloU or Bayesian filtering) to perform data association, but will fail when observations are discontinuous. In embodiments of the present disclosure, object models before and after observation interruption/loss in discontinuous observation scenes are used to implement the association, so that object association can be achieved efficiently.

Figure 2B:
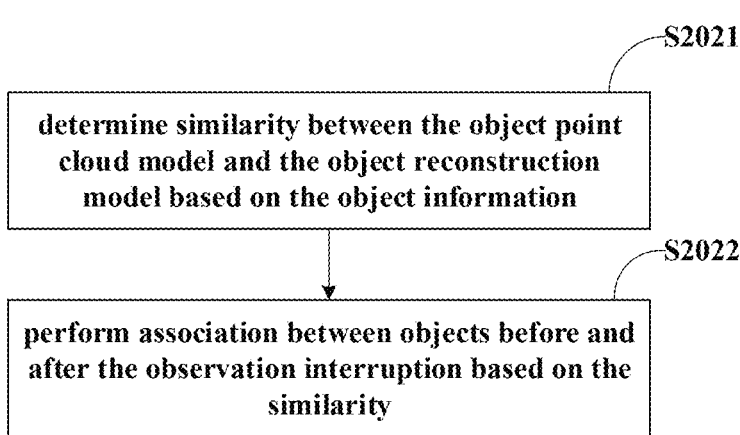

In some embodiments, in step S202, based on the acquired object model and an object reconstruction model, achieving association between objects before and after the observation interruption, can further include: in step S2021, determining similarity between the object point cloud model and the object reconstruction model based on the object information, and in step S2022, performing association between objects before and after the observation interruption based on the similarity, as shown in FIG. 2B.

In some embodiments, the object information may be various attribute information that characterizes the object, for example, various attribute information that can be acquired from object observation results, and may include at least one of object geometric feature, object texture feature, object color feature, etc. As an example, the object information may be extracted from observed object images, an object model obtained from object images, or the like.

In some embodiments, the object information includes both geometric feature and color feature, and the similarity between the object point cloud model and the object reconstruction model can be determined based on both the geometric feature and the color feature. In particular, in visual perception, similar objects tend to be similar in terms of structure and texture. Since some objects may have similar shapes or textures, it is difficult to distinguish them only by geometric information or only by color information. Therefore, the present disclosure proposes to determine model similarity using both geometric feature and color feature of the object as object information. As an example, both the geometric feature and the color feature of an object can be extracted from a color point cloud of the object derived from observed images of the object.

In some embodiments, the performing association between objects before and after the observation interruption based on the similarity may further include: determining a one-to-one correspondence between the objects before and after the observation interruption based on the similarity, so that the objects before and after the observation interruption are associated.

In some embodiments, the one-to-one correspondence between the objects before and after the observation is interrupted can be determined based on the maximum total similarity between the acquired object model and the object reconstruction model. Both the acquired object model and the object reconstruction model may contain parameter information of multiple objects, and the object parameters corresponding to the maximum similarity/maximum matching situation may indicate correspondence between objects. As an example, various appropriate algorithms may be used to determine the maximum matching condition between the acquired object model and the object reconstruction model so as to determine the correspondence between objects.

Figure 2C:
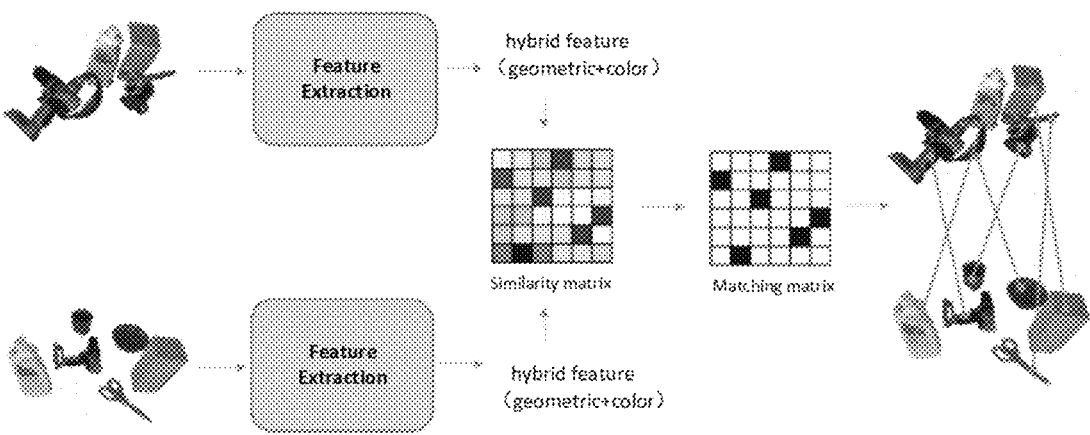
FIG. 2C shows a schematic diagram of an object matching process according to an embodiment of the present disclosure.

FIG. 2C shows a schematic diagram of an object matching process according to an embodiment of the present disclosure. First, from the object reconstruction module before the observation interruption and the acquired object module after the observation is resumed, their mixed features consisting of geometry and color are extracted respectively. The similarity between such two models is then estimated based on these features. Finally, an appropriate algorithm, a matching algorithm, such as Sinkhorn algorithm, to find the one-to-one correspondence between two sets that has the maximum total similarity.

In some embodiments, the method 200 may further include step S203: aligning the associated objects before and after observation interruption. After the model is associated with the 2.5D instance point cloud, coarse position information of the object model in the new scene, that is, respective position information of each observed object in the scene where the observation is resumed from interruption, can be obtained. However, the pose of the object relative to the camera may have changed significantly. Therefore, it is necessary to align the object with the new scene in order to better estimate the object's pose. The purpose of object pose estimation is to estimate the orientation and transformation of an object, which is crucial for robot operation. Object pose estimation can be implemented in various appropriate ways, such as LatentFusion, a framework for 6D pose estimation of an invisible object, which proposes to solve the 6D pose estimation of an invisible object by reconstructing an underlying 3D representation of the object using sparse reference views. Of course, object pose estimation can also be implemented in other ways, which will not be described in detail here.

In some embodiments, after achieving the association between objects before and after the observation interruption, poses of the objects before and after the observation interruption that are associated with or correspond to each other can be aligned. Object alignment can be achieved through various appropriate methods. In some embodiments, spatial transformation can be used to align the poses of the object after the observation is interrupted with that of the object before the observation is interrupted. As an example, object alignment can be achieved by aligning an acquired object model, such as an object point cloud model, with an object reconstruction model, such as an object surfel model, through a specific transformation. Object alignment can be achieved by various suitable methods/algorithms, which will not be described in detail here. Therefore, through the object association and alignment according to the present disclosure, the object point cloud model obtained from a single or a small number of benchmark images can be further modified based on the object reconstruction model after the observation is resumed, so that the object model obtained after the observation is resumed can be more complete and better reflect the conditions of the observed object, for example, compared with a single view, the solution according to the present disclosure can better acquire a model of an object that is partially or fully occluded due to scene changes, observation interruption, etc.

It should be noted that the alignment operation is not necessary for the solution of the present disclosure, that is to say, even if the alignment operation is not performed, the solution of the present disclosure can still accurately and efficiently determine the association between objects before and after the observation interruption by using the object model, to efficiently achieve object localization in discontinuous observation scenes.

Figure 3:
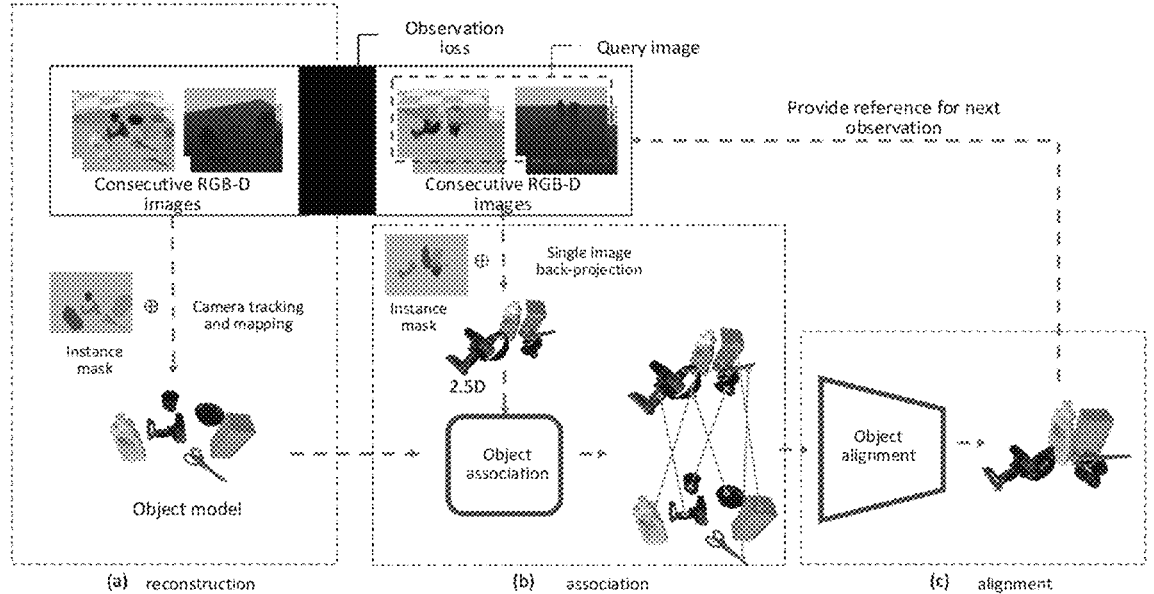
FIG. 3 shows an object association example according to an embodiment of the present disclosure.

An instance of object localization in a discontinuous observation scene according to an embodiment of the present disclosure will be described below with reference to FIG. 3.

The present disclosure aims at reconstructing and localize dynamic objects without known computer-aided design models and continuous observations, and proposes to solve this problem by using object models, especially the object reconstruction models and the object model obtained after the observation is resumed from interruption. FIG. 3 schematically illustrates three components of an exemplary instance according to the present disclosure: object model reconstruction, object association, and object alignment. Among them, in the object model reconstruction, consecutive frames can be used as input, and the object model is reconstructed based on the SLAM system, in the object association, the object-level data association between non-consecutive frames, that is, a previous observation frame and a new observation frame, can be performed: and in the object alignment, the object model can be aligned with new observations through a point cloud registration network. The implementation of each component in the solution of the present disclosure will be described in detail below.

For object model reconstruction, in this example, an object model $M_m$, m=0 . . . N can be reconstructed by taking a video segment $V_t$ containing consecutive RGB images and depth images as input. Specifically, to reconstruct an object model, an implementation of MaskFusion can be used for camera tracking and object-level construction during video editing. MaskFusion represents the object model in terms of surfels and performs the camera tracking by aligning a given RGB-D image with the projection of the reconstruction model. To achieve reconstruction of each object, Mask R-CNN can be used to obtain instance masks, and each instance mask can be fused into the object-level construction. In addition, in order to better cope with object reconstruction, the present disclosure further trains a category-independent segmentation network, which can be combined with MaskFusion to perform dynamic object reconstruction of a wider range of categories.

When a previous observation is lost and a new observation arrives, it may need to find the correspondence between the reconstructed object and the new scene. However, directly aligning the object model into the new scene is time-consuming and can lead to ambiguous matching. Therefore, there is proposed a coarse-to-fine multi-object alignment process. In coarse matching, a association module is introduced to estimate the similarity between the object model and the 2.5D instance point cloud in the benchmark image (query image), and then the matching therebetween can be found. These matching can provide each object with an approximate location in the new scene. Under the guidance of the instance segmentation network, the 2.5D instance point clouds can be obtained from the depth image by back-projection.

In the association operation of this example, two sets of color point clouds are used as input: the object reconstruction model $M_m$ and the 2.5D instance point cloud $P_n$ extracted from the benchmark image through back-projection, and their respective geometric features and color features can be extracted for achieving the association.

1) Geometric features: a geometric feature extraction part is implemented through a PointNet++ network. Specifically, a function $F(o) \in R^N$ can be utilized to process unordered point clouds and encode them into fixed-length vectors, here N=1024.
  2) Color features: color distribution can be analyzed to help to distinguish different objects through statistical histograms. Specifically, a three-dimensional histogram H of size (32, 32, 32) is used to calculate the RGB distribution. The three channels of the histogram can represent red, green, and blue in the same way as an RGB image. The (256, 256, 256) color space in the image can be scaled down to a smaller (32, 32, 32) color space to improve efficiency and achieve robust performance to lighting changes in different scenes.

$$\mathcal{H}_{X(i,j,k)} = \sum_{p \in X} h_p(i, j, k), \tag{1}$$

$$h_p(i, j, k) = \begin{cases} 1, & \text{if } i = p_r, j = p_g, k = p_b \\ 0, & \text{otherwise} \end{cases} \tag{2}$$

Among them, i, j, and k can respectively represent three-channel element coordinates in the three-dimensional histogram, when the object model has a number x of R, G, and B color elements, the corresponding histogram element value is x.

Feature extraction can be performed using various appropriate methods, such as various methods well known in the art, which will not be described in detail here. As an example, a multi-scale multi-group classification version of PointNet++ can be used in the feature extractor.

Then, based on the acquired geometric features and color features, one-to-one matching between the reconstructed m objects $M_m$ and the 2.5D instance point cloud $P_n$ in the benchmark image can be found. The one-to-one matching problem can be formulated as an optimal transmission problem, and the one-to-one matching can be determined by solving this problem.

Specifically, the weighted sum S of $S_{geo}$ and $S_{rgb}$ can be used to evaluate the similarity between such two sets. Let x, y be two different point clouds, for example, corresponding to the object reconstruction model and the object model obtained after observation resumption respectively.

$$S_{geo} = \phi(\mathcal{F}(X)) \cdot \phi(\mathcal{F}(Y)), \tag{3}$$

$$S_{rgb} = \phi(\beta(\mathcal{H}(X))) \cdot \phi(\beta(\mathcal{H}(Y))), \tag{4}$$

$$S = S_{geo} + \lambda S_{rgb}. \tag{5}$$

where $\phi$ is a $L_2$ normalization function. $\beta$ is a flattening function that converts a three-dimensional histogram of color features into a vector. $\lambda$ can be any suitable value, such as 0.1.

The goal of the one-to-one matching problem is to find a correspondence relationship between two sets that maximizes the total similarity therebetween. Specifically, it is necessary to find the maximum weight matching between m object models and n 2.5D instance point clouds, which is formulated as an optimal transmission theoretical model. Furthermore, when some objects disappear or new objects appear, n and m may not be equal. In order to handle these situations, slack variables are introduced into the formula to find objects that have no corresponding relationship. Taking the case of m<n as an example, the n×n distance matrix D can be defined as follows:

$$D_{ij} = \begin{cases} S(M_i, P_j), & \text{if } i \le m \\ 0, & \text{otherwise} \end{cases} \tag{6}$$

The transmission matrix is T, where $T_{ij}$ means the matching probability of $M_i$ and $P_j$. The matching problem can be formulated as:

$$\arg\max_{T\in\mathbb{R}^{n\times n}}\langle T, D\rangle, \tag{7}$$

$$\langle T, D\rangle = \sum_i \sum_j T(i, j)D(i, j), \tag{8}$$

s.t.

$$\sum_i T(i, j) = 1, \tag{9}$$

$$\sum_j T(i, j) = 1.$$

Finally, the Sinkhorn algorithm is used to solve (7) to obtain the one-to-one correspondence relationship. When $T_{ij}>0.5$ and neither $M_i$ nor $P_j$ are slack variables, (i, j) can be considered to be a good match, otherwise the match will be abandoned.

After the model is associated with the 2.5D instance point cloud, the coarse position information of the object model in the new scene can be obtained. However, considering that the pose of the object relative to the camera may have changed significantly, it may need to align the object with the new scene in order to obtain an accurate 6-DOF (degrees of freedom) pose. In the present disclosure, objects are represented by surfels in the reconstruction model, and surfles are similar with point clouds in terms of geometry and color, so object poses can be aligned with new scenes through point cloud registration. Point cloud registration refers to a problem of finding a rigid transformation to align two given point clouds, such as a reconstruction model and an object model after observation resumption. Formularily, given two point clouds X and Y, the goal is to find a transformation $T\in SE3$ that aligns the two point clouds. In an implementation, RPMNet can be applied to each pre-matched point cloud collection, RPMNet is a point cloud registration network that achieves optimal performance in partial, noisy and unseen point cloud registration tasks.

According to embodiments of the present disclosure, before the point cloud is input into the network, further processing may be performed to optimize the alignment process. As an example, a filter with a radius of 0.005 and at least 16 neighboring points can be used for filtering. A point cloud with a voxel size of 0.01 is then downsampled. Finally, the point cloud is scaled down to a unit sphere and translated to the origin. Before the reference model is passed into RPMNet, several hypotheses with initial angles of 90 degrees, 180 degrees, and 270 degrees are generated for each axis, which further reduces the sensitivity to the initial angle between the two point clouds. These operations can be performed based on an Open3D library, of course, can be performed based on any other suitable library.

Figure 4:
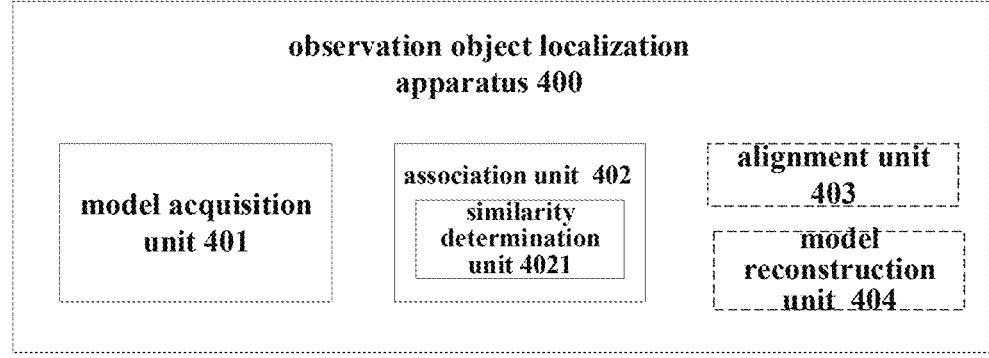
FIG. 4 shows an apparatus for object localization in a discontinuous observation scene according to an embodiment of the present disclosure.

FIG. 4 shows an apparatus for object localization in a discontinuous observation scene according to an embodiment of the present disclosure. The apparatus 400 includes: a module acquisition unit 401 configured to acquire an object model based on a benchmark image that is obtained when observation is resumed from interruption: and an association unit 402 configured to, based on the acquired object model and an object reconstruction model, achieve association between objects before and after the observation interruption.

In some embodiments, the association unit 402 further includes: a similarity determination unit 4021 configured to determine similarity between the object point cloud model and the object reconstruction model based on object information, and the association unit can be further configured to perform association between objects before and after the observation interruption based on the similarity.

In some embodiments, the object information includes both geometric feature and color feature, and the similarity determination unit can be further configured to determine the similarity between the object point cloud model and the object reconstruction model based on both the geometric feature and the color feature.

In some embodiments, the association unit 402 is further configured to: determine a one-to-one correspondence between the objects before and after the observation interruption based on the similarity, so that the objects before and after the observation interruption can be associated. In some embodiments, the one-to-one correspondence between the objects before and after the observation is interrupted can be determined based on a maximum total similarity between multiple object information and multiple object models. In particular, the determination of the one-to-one correspondence between objects can be implemented by a matching unit, that is, the association unit includes a matching unit configured to determine the one-to-one correspondence between the objects before and after the observation interruption based on the similarity. Of course, in implementation, the operations of the similarity determination unit and the matching unit can all be implemented by the association unit itself.

In some embodiments, the object localization apparatus 400 may further include: an alignment unit 403 configured to align the associated objects before and after the observation interruption. In some embodiments, the alignment unit is configured to align the poses of the object after the observation is interrupted with that of the object before the observation is interrupted.

In some embodiments, the object localization apparatus may further include a model reconstruction unit 404 configured to perform model reconstruction for an object based on consecutive images of the object. In some embodiments, the consecutive images of the object may be a predetermined number of consecutive observation images before the observation is interrupted. In some embodiments, the object reconstruction model can be any one selected from a group comprising a surfel-based model and a point cloud model. In some embodiments, the consecutive images may include consecutive RGB images and depth images of the object, and the model reconstructed based on the consecutive images can be a surfel-based model. It should be noted that the model reconstruction unit may not be included in the object localization apparatus, and may be called by the object localization apparatus during operation to perform model reconstruction.

It should be noted that the model reconstruction unit 404 is shown with a dotted line to indicate that the model reconstruction unit 404 may also be located outside the object localization apparatus 400, for example, in this case, the apparatus 400 can still achieve the advantageous effects of the present disclosure as mentioned above.

It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as separate physical entities, or may be implemented by a single entity (for example, a processor (CPU or DSP, etc.), an integrated circuit, etc.). Furthermore, that the above units are shown in the figures with a dotted line can indicate that such units may not actually exist, and the operations/functions as they implement can be implemented by the processing circuit itself.

Furthermore, although not shown, the apparatus may include a memory, which may store various information generated in operation by the apparatus as well as each module included in the apparatus, programs and data for operation, data to be transmitted by a communication unit, and so on. The memory may be volatile memory and/or non-volatile memory. For example, the memory may include, but not limited to, random access memory (RAM), dynamic random access memory (DRAM), static random access memory (SRAM), read only memory (ROM), and flash memory. Of course, the memory may also be located external to the apparatus. Alternatively, although not shown, the apparatus may also include a communication unit which can communicate with other apparatuses. In an example, the communication unit can be implemented in any appropriate manner known in the art, for example, communication components such as an antenna array and/or radio frequency links, various types of interfaces, communication unit, etic, which will be not described in detail here. Furthermore, the apparatus can further include other components not shown, such as frequency links, baseband processing units, network interfaces, processors, controllers, etc., which will not be described in detail here.

The solution according to the present disclosure can form an object observation system alone or in combination with any existing object observation solution, the system can be used to observe objects, such as continuous observation, and when the observation is resumed from interruption/lose, can perform the object localization under discontinuous observation according to the present disclosure. Specifically, when the object observation system according to the present disclosure starts, the object model in the scene can be reconstructed with consecutive RGB-D video frames as input as the object is observed, which can be performed by the dynamic object reconstruction module. When the observation is interrupted/the scene changes, the association module obtains the 2.5D instance point cloud in the new observation, and then evaluates the similarity between the reconstructed object model and the 2.5D instance point cloud in the new observation to find one-to-one correspondence before and after the observation is interrupted/the scene changes. These correspondences provide each object with an approximate location in the new scene. Then, object alignment is performed in the alignment module, for example, a rigid point cloud registration method based on deep learning that is less sensitive to initialization and more robust can be used to align two point cloud instance clusters. As a result, a novel dynamic object observation system can be implemented for the reconstruction, association and alignment of multiple unseen objects without the need of additional training on new objects between different scenes. And experiments show that our system is a versatile and most advanced system that can support various tasks such as model-free object pose estimation, single-view object completion, and real robot grasping.

The following will further demonstrate the effectiveness of the solution of the present disclosure in conjunction with experimental examples, including 6-degree-of-freedom object pose estimation and robot grasping.

By performing evaluation on the public YCBVideo and Model-Free Object Pose Estimation Dataset (MOPED) data sets, it can be shown that the performance of the system according to the present disclosure is excellent in 6-degree-of-freedom pose estimation, compared with zero-shot methods, such as ZePHYR, and model-based methods, such as Cosy Pose, Pix2Pose, and EPOS, the method according to the present disclosure can obtain better and more accurate pose estimation.

The system according to the present disclosure can also be well applied to various application tasks, especially robot grasping tasks. A UR5 robotic arm with a robotiq-2f-85 gripper and a wrist-mounted Realsense D435i RGB-D camera was used as the hardware platform. The system according to the present disclosure can assist the robot grasping task in the following steps: a) the robot arm scans messy objects disposed on the table, during the scanning process, the model for an unknown object model can be reconstructed by the system according to the present disclosure. b) the robotic arm acquires a query image from a single perspective and can use the system according to the present disclosure to align the reconstructed object model with the object in the query image and obtain an aligned object point cloud. c) Feed the aligned object point cloud into an existing grasp pose generation model to generate candidate grasps. Compared with a single-view point cloud, the aligned object point cloud output by the system according to the present disclosure is more complete, for example, a completely occluded or partially occluded object can still be appropriately localized, so that the grasping pose generation module can generating grasping for an occluded part of the object or the occluded object.

Therefore, this disclosure mainly considers a completely new task of dynamic object reconstruction and localization without continuous observation and a known priori CAD model, and proposes a new system to perform dynamic object-level reconstruction, multi-object association and alignment. The system according to the present disclosure are versatile and most advanced in various tasks such as model-free object pose estimation, model alignment-based single-view object completion, and dynamic multi-object robotic grasping.

Figure 5:
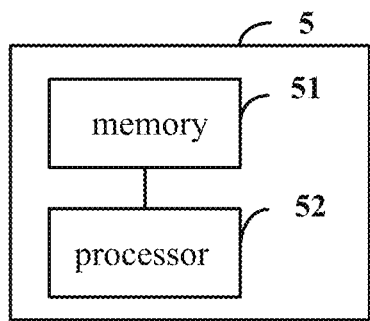
FIG. 5 shows a block diagram of a certain embodiment of an electronic device of the present disclosure.

Some embodiments of the present disclosure also provide an electronic device that can operate to implement the operations/functions of the aforementioned object localization apparatus. FIG. 5 shows a block diagram of some embodiments of the electronic device according to the present disclosure. For example, in some embodiments, the electronic device 5 may be various types of devices, including but not limited to mobile phones, laptops, digital broadcast receivers, PDAs (Personal Digital Assistants), PADs (Tablets), Mobile terminals such as PMP (Portable Multimedia Player), vehicle-mounted terminals (such as vehicle-mounted navigation terminals), and fixed terminals such as digital TVs, desktop computers, and the like. For example, the electronic device 5 may include a display panel for displaying data utilized in solutions according to the present disclosure and/or execution results. For example, the display panel may be in various shapes, such as a rectangular panel, an oval panel, a polygonal panel, etc. In addition, the display panel can be not only a flat panel, but also a curved panel or even a spherical panel.

As shown in FIG. 5, the electronic device 5 of this embodiment includes a memory 51 and a processor 52 coupled to the memory 51. It should be noted that the components of the electronic device 5 shown in FIG. 5 are only exemplary and not restrictive. The electronic device 5 may also have other components according to actual application requirements. Processor 52 may control other components in electronic device 5 to perform desired functions.

In some embodiments, memory 51 is used to store one or more computer-readable instructions. When the processor 52 can execute computer-readable instructions, the computer-readable instructions when executed by the processor 52 implement the method according to any of the above embodiments. For the specific implementation and related explanations of each step of the method, please refer to the above-mentioned embodiments, and repeated details will not be repeated here.

For example, processor 52 and memory 51 may communicate with each other directly or indirectly. For example, processor 52 and memory 51 may communicate over a network. The network may include a wireless network, a wired network, and/or any combination of wireless and wired networks. The processor 52 and the memory 51 can also communicate with each other through a system bus, which is not limited in this disclosure.

For example, the processor 52 may be embodied as various appropriate processors, processing devices, etc., such as a central processing unit (CPU), a graphics processing unit (GPU), a network processor (NP), etc.; it may also be a digital Signal processor (DSP), application specific integrated circuit (ASIC), field programmable gate array (FPGA) or other programmable logic devices, discrete gate or transistor logic devices, discrete hardware components. The central processing unit (CPU) can be X86 or ARM architecture, etc. For example, memory 51 may include any combination of various forms of computer-readable storage media, such as volatile memory and/or non-volatile memory. The memory 51 may include, for example, a system memory, which stores, for example, an operating system, application programs, a boot loader, a database, and other programs. Various applications and various data can also be stored in the storage medium.

Figure 6:
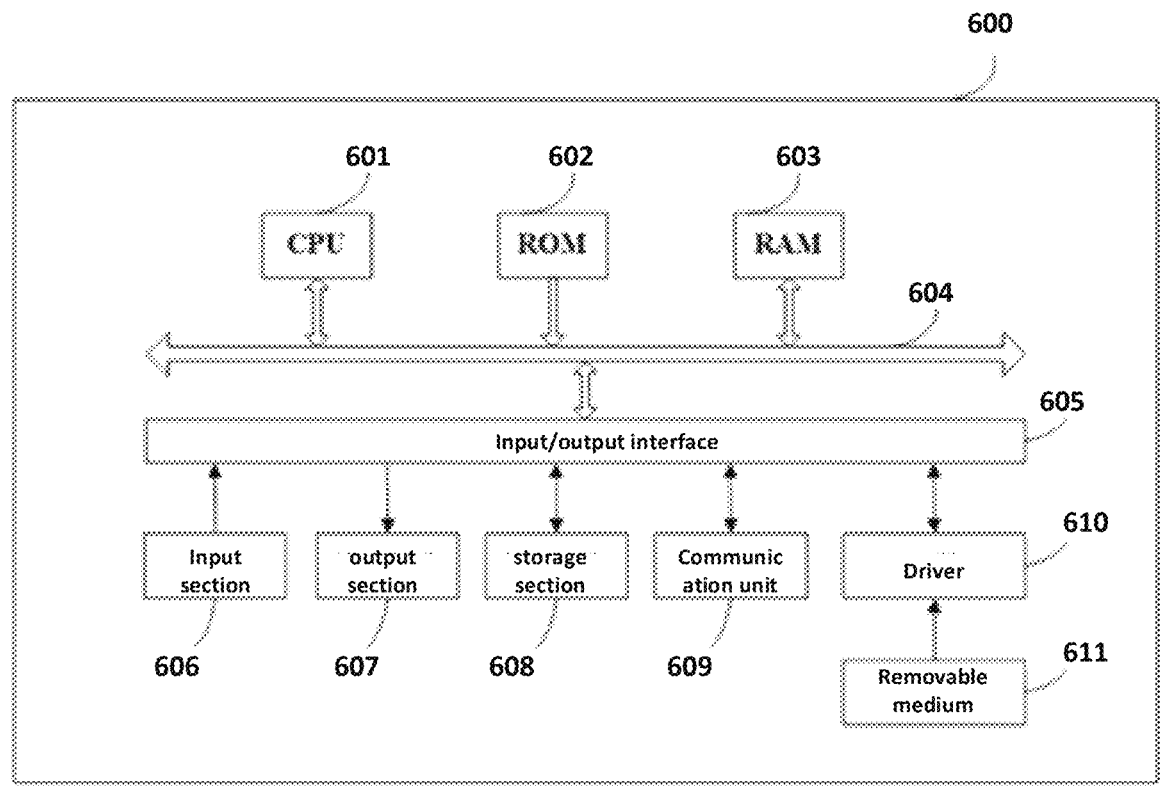
FIG. 6 shows a block diagram of further embodiment of the electronic devices of the present disclosure.

In addition, according to some embodiments of the present disclosure, when various operations/processes according to the present disclosure are implemented by software and/or firmware, programs that constitute the software can be installed from a storage medium or a network to a computer system with a dedicated hardware structure, such as the computer system 600 shown in FIG. 6, the computer system, when installed with a variety of programs, can perform various functions, including the functions described above and so on. FIG. 6 is a block diagram illustrating an exemplary structure of a computer system that may be employed in embodiments of the present disclosure.

In FIG. 6, a central processing unit (CPU) 601 performs various processes according to programs stored in a read-only memory (ROM) 602 or programs loaded from a storage section 608 into a random access memory (RAM) 603. In the RAM 603, data required when the CPU 601 performs various processes and the like is also stored as necessary. The central processing unit is only exemplary, and it may also be other types of processors, such as the various processors mentioned above. ROM 602, RAM 603, and storage portion 608 may be various forms of computer-readable storage media, as described below. It should be noted that although ROM 602, RAM 603 and storage device 608 are shown separately in FIG. 6, one or more of them may be combined or located in the same or different memory or storage module.

The CPU 601, ROM 602, and RAM 603 are connected to each other via a bus 604. Input/output interface 605 is also connected to bus 604.

The following components are connected to the input/output interface 605: an input portion 606, such as a touch screen, touch pad, keyboard, mouse, image sensor, microphone, accelerometer, gyroscope, etc.; an output portion 607, including a display, such as a cathode ray tube (CRT)), liquid crystal display (LCD), speakers, vibrators, etc.; a storage section 608, including hard disk, tape, etc.; and a communication section 609, including network interface cards such as LAN cards, modems, etc. The communication section 609 allows communication processing to be performed via a network such as the Internet. It is easy to understand that although as shown in FIG. 6, each apparatus or module in the electronic device 600 communicate through the bus 604, they can also communicate through a network or other means, where the network can include a wireless network or a wired network, and/or any combination of wireless and wired networks.

Driver 610 is also connected to input/output interface 605 as needed. Removable media 611 such as magnetic disks, optical disks, magneto-optical disks, semiconductor memories, etc. are installed on the drive 610 as needed, so that computer programs read therefrom are installed into the storage section 608 as needed.

In the case where the above-described series of processing is implemented by software, the program constituting the software can be installed from a network such as the Internet or a storage medium such as the removable medium 611.

According to embodiments of the present disclosure, the processes described above with reference to the flowcharts may be implemented as a computer software program. For example, embodiments of the present disclosure may include a computer program product including a computer program carried on a computer-readable medium, the computer program containing program codes for performing a method according to an embodiment of the disclosure. In such embodiments, the computer program may be downloaded and installed from the network via communication device 609, or from storage device 608, or from ROM 602. When the computer program is executed by the CPU 601, the above-described functions defined in the method according to the embodiment of the present disclosure can be performed.

It should be noted that in the context of the present disclosure, a computer-readable medium may be a tangible medium that may contain or store programs which can be used by or in conjunction with an instruction execution system, apparatus, or device. The computer-readable medium may be a computer-readable signal medium or a computer-readable storage medium or any combination of the two. The computer-readable storage medium may be, for example, but not limited to: an electronic, magnetic, optical, electromagnetic, infrared, or semiconductor system, apparatus or device, or any combination thereof. More specific examples of computer readable storage media may include, but not limited to: an electrical connection having one or more wires, a portable computer disk, a hard drive, random access memory (RAM), read only memory (ROM), removable Programmed read-only memory (EPROM or flash memory), fiber optics, portable compact disk read-only memory (CD-ROM), optical storage device, magnetic storage device, or any suitable combination of the above. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program codes embodied on a computer-readable medium may be transmitted using any suitable medium, including but not limited to: wire, optical cable, RF (radio frequency), etc., or any suitable combination of the above.

The above-mentioned computer-readable medium may be included in the above-mentioned electronic device: it may also exist alone without being assembled into the electronic device.

In some embodiments, there is also provided a computer program including: instructions, which when executed by a processor cause the processor to perform the method of any of the above embodiments. For example, instructions may be embodied as computer program codes.

In embodiments of the present disclosure, computer program codes for performing operations of the present disclosure may be written in one or more programming languages or a combination thereof, the programming languages including but not limited to object-oriented programming languages, such as Java, Smalltalk, C++, and conventional procedural programming languages such as the "C" language or similar programming languages. The program codes may be executed entirely on the user's computer, partly on the user's computer, as a stand-alone software package, partly on the user's computer and partly on a remote computer, or entirely on the remote computer or server. In situations involving remote computers, the remote computer may be connected to the user's computer through any kind of network, including a local area network (LAN) or a wide area network (WAN), or may be connected to an external computer, such as an Internet service provider through Internet connection).

The flowcharts and block diagrams in the drawings illustrate the architecture, functionality, and operations of possible implementations of systems, methods, and computer program products according to various embodiments of the present disclosure. In this regard, each block in the flowchart or block diagram may represent a module, segment, or a portion of code that contains one or more logic functions that implement the specified executable instructions. It should also be noted that, in some alternative implementations, the functions noted in the blocks may occur in an order other than that noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by special purpose hardware-based systems that perform the specified functions or operations, or can be implemented using a combination of specialized hardware and computer instructions.

The modules, components or units described in the embodiments of the present disclosure may be implemented in software or hardware. The name of a module, component or unit does not constitute a limitation on the module, component or unit itself under certain circumstances.

The functions described above herein may be performed, at least in part, by one or more hardware logic components. For example, without limitation, exemplary hardware logic components that may be used include: field programmable gate array (FPGA), application specific integrated circuit (ASIC), application specific standard product (ASSP), system on chip (SOC), complex programmable Logical device (CPLD) and so on.

According to some embodiments of the present disclosure, there is provided a method of object localization in a discontinuous observation scene, including the following steps: acquiring an object model based on a benchmark image that is obtained when observation is resumed from interruption: and based on the acquired object model and an object reconstruction model, achieving association between objects before and after the observation interruption.

In some embodiments, the object reconstruction model can be obtained by perform model reconstruction for the object based on consecutive images of the object. In some embodiments, the consecutive images of the object can be a predetermined number of consecutive observation images before the observation is interrupted.

In some embodiments, the object reconstruction model is any one selected from a group comprising a surfel-based model and a point cloud model.

In some embodiments, the consecutive images include consecutive RGB images and depth images of the object, and the model reconstructed based on the consecutive images is a surfel-based model.

In some embodiments, the object model acquired based on the benchmark image is an object point cloud model. In some embodiments, the benchmark image is a starting image obtained when the observation is resumed, and a 2.5D instance point cloud is obtained from the starting image as the object point cloud model.

In some embodiments, based on the acquired object model and an object reconstruction model, achieving association between objects before and after the observation interruption further includes: determining similarity between the object point cloud model and the object reconstruction model based on object information, and performing association between objects before and after the observation interruption based on the similarity.

In some embodiments, the object information includes at least one of object geometric feature, object texture feature, object color feature. In some embodiments, the object information includes both geometric feature and color feature, and the similarity between the object point cloud model and the object reconstruction model can be determined based on both the geometric feature and the color feature.

In some embodiments, performing association between objects before and after the observation interruption based on the similarity further includes: determining a one-to-one correspondence between the objects before and after the observation interruption based on the similarity, so that the objects before and after the observation interruption can be associated. In some embodiments, the one-to-one correspondence between the objects before and after the observation is interrupted can be determined based on a maximum total similarity between multiple object information and multiple object models.

In some embodiments, the method further includes aligning the associated objects before and after the observation interruption. In some embodiments, spatial transformation can be used to align poses of the object after the observation is interrupted with the object before the observation is interrupted.

According to some embodiments of the present disclosure, there is provided an apparatus for object localization in a discontinuous observation scene including: a module acquisition unit configured to acquire an object model based on a benchmark image that is obtained when observation is resumed from interruption: and a association unit configured to, based on the acquired object model and an object reconstruction model, achieve association between objects before and after the observation interruption.

In some embodiments, the association unit further includes: a similarity determination unit configured to determine similarity between the object point cloud model and the object reconstruction model based on object information, and the association unit can be further configured to perform association between objects before and after the observation interruption based on the similarity.

In some embodiments, the object information can include both geometric feature and color feature, and the similarity determination unit can be further configured to determine the similarity between the object point cloud model and the object reconstruction model based on both the geometric feature and the color feature.

In some embodiments, the association unit can be further configured to: determine a one-to-one correspondence between the objects before and after the observation interruption based on the similarity, so that the objects before and after the observation interruption can be associated. In some embodiments, the one-to-one correspondence between the objects before and after the observation is interrupted can be determined based on a maximum total similarity between multiple object information and multiple object models.

In some embodiments, the object localization apparatus may further include: an alignment unit configured to align the associated objects before and after the observation interruption. In some embodiments, the alignment unit is configured to align the poses of the object after the observation is interrupted with the object before the observation is interrupted.

In some embodiments, the object localization apparatus may further include a model reconstruction unit configured to perform model reconstruction for an object based on consecutive images of the object. In some embodiments, the consecutive images of the object may be a predetermined number of consecutive observation images before the observation is interrupted. In some embodiments, the object reconstruction model can be any one selected from a group comprising a surfel-based model and a point cloud model. In some embodiments, the consecutive images may include consecutive RGB images and depth images of the object, and the model reconstructed based on the consecutive images can be a surfel-based model.

According to further embodiments of the present disclosure, an electronic device is provided, including: a memory: and a processor coupled to the memory, the memory storing instructions thereon, and the instructions, when executed by the processor, cause the electronic device to perform the method of any embodiment described in this disclosure.

According to further embodiments of the present disclosure, there is provided a computer-readable storage medium with a computer program stored thereon, and when the program is executed by a processor, the method of any embodiment described in the present disclosure can be implemented.

According to further embodiments of the present disclosure, there is provided a computer program comprising instructions that, when executed by a processor, cause the processor to perform the method of any embodiment described in the disclosure.

According to some embodiments of the present disclosure, there is provided a computer program product comprising instructions that, when executed by a processor, implement the method of any embodiment described in the present disclosure.

According to some embodiments of the present disclosure, there is provided a computer program comprising program codes that when executed by a computer causes implementation of a method of any of the embodiments described in the present disclosure.

The above description is merely an illustration of some embodiments of the present disclosure and the technical principles employed. Those skilled in the art should understand that the disclosure scope involved in the present disclosure is not limited to technical solutions composed of specific combinations of the above technical features, but should also cover other solutions composed of the above technical features or their equivalent features in any combination, without departing from the above disclosed concept, for example, a technical solution that is formed by replacing the above features with technical features with similar functions disclosed in this disclosure (but not limited) with each other.

In the description provided herein, many specific details are set forth. However, it shall be understood that embodiments of the present disclosure may be practiced without these specific details. In other instances, well-known methods, structures and techniques have not been shown in detail so as not to obscure the understanding of this description.

Furthermore, although operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although some specific embodiments of the present disclosure have been described in detail through examples, those skilled in the art will understand that the above examples are for illustration only and are not intended to limit the scope of the disclosure. It should be understood by those skilled in the art that the above embodiments may be modified without departing from the scope and spirit of the present disclosure. The scope of the disclosure is defined by the appended claims.

What is claimed is:

1. A method of object localization in a discontinuous observation scene in computer vision, comprising the following steps:

acquiring an object reconstruction model of an object before object observation is interrupted, by performing model reconstruction based on consecutive images of the object obtained before the object observation is interrupted, acquiring an object point cloud model of the object after the object observation is resumed from the object observation interruption, based on a benchmark image that is obtained when the object observation is resumed; and based on the object point cloud model and the object reconstruction model, achieving association between objects before the object observation is interrupted and after the object observation is resumed, for the object localization after the object observation is resumed, wherein, based on the object point cloud model and the object reconstruction model, achieving the association between the objects before the object observation is interrupted and after the object observation is resumed, further comprises:

determining a similarity between the object point cloud model and the object reconstruction model based on object information, wherein the object information comprises at least one of object geometric feature, object texture feature, or object color feature, and performing the association between the objects before the object observation is interrupted and after the object observation is resumed based on the similarity.

2. The method of claim 1, wherein, the consecutive images comprise consecutive RGB images and depth images of the object, and the object reconstruction model is a surfel-based model.

3. The method of claim 1, wherein, the benchmark image is a starting image obtained when the object observation is resumed, and a 2.5D instance point cloud is obtained from the starting image as the object point cloud model.

4. The method of claim 1, wherein, the object information comprises both the object geometric feature and the object color feature, and the similarity between the object point cloud model and the object reconstruction model is determined based on both the object geometric feature and the object color feature.

5. The method of claim 1, wherein, performing the association between the objects before the object observation is interrupted and after the object observation is resumed based on the similarity further comprises:

determining a one-to-one correspondence between the objects before the object observation is interrupted and after the object observation is resumed based on the similarity, so that the objects before the object observation is interrupted and after the object observation is resumed are associated.

6. The method of claim 5, wherein, the one-to-one correspondence between the objects before the object observation is interrupted and after the object observation is resumed is determined based on a maximum total similarity between multiple object information and multiple object models.

7. The method of claim 1, wherein, the method further comprises:

aligning the associated objects before the object observation is interrupted and after the object observation is resumed.

8. The method of claim 7, wherein, spatial transformation is used to align poses of the object after the object observation is resumed with the object before the object observation is interrupted.

9. An electronic device, comprising:

a memory; and a processor coupled to the memory, the memory storing instructions thereon, wherein the instructions, when executed by the processor, cause the electronic device to perform:

acquiring an object reconstruction model of an object before object observation is interrupted, by performing model reconstruction based on consecutive images of the object obtained before the object observation is interrupted, acquiring an object point cloud model of the object after the object observation is resumed from the object observation interruption, based on a benchmark image that is obtained when the object observation is resumed; and based on the object point cloud model and the object reconstruction model, achieving association between objects before the object observation is interrupted and after the object observation is resumed, for object localization after the object observation is resumed, wherein, based on the object point cloud model and the object reconstruction model, achieving the association between the objects before the object observation is interrupted and after the object observation is resumed further comprises:

determining a similarity between the object point cloud model and the object reconstruction model based on object information, wherein the object information comprises at least one of object geometric feature, object texture feature, or object color feature, and performing the association between the objects before the object observation is interrupted and after the object observation is resumed based on the similarity.

10. The electronic device of claim 9, wherein, the consecutive images comprise consecutive RGB images and depth images of the object, and the model reconstructed based on the consecutive images is a surfel-based model, or, wherein the benchmark image is a starting image obtained when the object observation is resumed, and a 2.5D instance point cloud is obtained from the starting image as the object point cloud model.

11. The electronic device of claim 9, wherein, performing the association between the objects before the object observation is interrupted and after the object observation is resumed based on the similarity further comprises:

determining a one-to-one correspondence between the objects before the object observation is interrupted and after the object observation is resumed based on the similarity, so that the objects before the object observation is interrupted and after the object observation is resumed are associated.

12. The electronic device of claim 9, wherein, the instructions, when executed by the processor, cause the electronic device to further perform:

aligning the associated objects before the object observation is interrupted and after the object observation is resumed.

13. A non-transitory computer-readable storage medium with a computer program stored thereon, wherein the program, when executed by a processor, causes the processor to implement:

acquiring an object reconstruction model of an object before object observation is interrupted, by performing model reconstruction based on consecutive images of the object obtained before the object observation is interrupted, acquiring an object point cloud model of the object after the object observation is resumed from the object observation interruption, based on a benchmark image that is obtained when the object observation is resumed; and based on the object point cloud model and the object reconstruction model, achieving association between objects before the object observation is interrupted and after the object observation is resumed, for object localization after the object observation is resumed, wherein, based on the object point cloud model and the object reconstruction model, achieving the association between the objects before the object observation is interrupted and after the object observation is resumed further comprises:

determining a similarity between the object point cloud model and the object reconstruction model based on object information, wherein the object information comprises at least one of object geometric feature, object texture feature, or object color feature, and performing the association between the objects before the object observation is interrupted and after the object observation is resumed based on the similarity.

14. The non-transitory computer-readable storage medium of claim 13, wherein, the consecutive images comprise consecutive RGB images and depth images of the object, and the model reconstructed based on the consecutive images is a surfel-based model, or, wherein the benchmark image is a starting image obtained when the object observation is resumed, and a 2.5D instance point cloud is obtained from the starting image as the object point cloud model.

15. The non-transitory computer-readable storage medium of claim 13, wherein, performing the association between the objects before the object observation is interrupted and after the object observation is resumed based on the similarity further comprises:

determining a one-to-one correspondence between the objects before the object observation is interrupted and after the object observation is resumed based on the similarity, so that the objects before the object observation is interrupted and after the object observation is resumed are associated.

16. The non-transitory computer-readable storage medium of claim 13, wherein the program, when executed by the processor, causes the processor to further implement:

aligning the associated objects before the object observation is interrupted and after the object observation is resumed.

* * * * *